United States Patent
Lin et al.

(10) Patent No.: US 11,937,251 B2
(45) Date of Patent: Mar. 19, 2024

(54) APPARATUSES AND METHODS FOR FLEXIBLE RESOURCE UNIT (RU) ALLOCATION

(71) Applicant: MEDIATEK INC., Hsinchu (TW)

(72) Inventors: Ying-You Lin, Hsinchu (TW);
Hung-Tao Hsieh, Hsinchu (TW);
Tung-Sheng Yang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 85 days.

(21) Appl. No.: 17/088,652

(22) Filed: Nov. 4, 2020

(65) Prior Publication Data

US 2021/0136735 A1    May 6, 2021

Related U.S. Application Data (60) Provisional application No. 62/930,692, filed on Nov. 5, 2019.

(51) Int. Cl.
*H04W 72/23* (2023.01)
(52) U.S. Cl.
CPC .................. *H04W 72/23* (2023.01)
(58) Field of Classification Search
CPC ... H04L 5/0042; H04L 1/0023; H04L 5/0087; H04L 5/0092; H04L 5/0044; H04W 16/02; H04W 72/042
See application file for complete search history.

(56) References Cited

U.S. PATENT DOCUMENTS

| | | | |
|---|---|---|---|
| 11,166,159 B1* | 11/2021 | Berger | H04W 64/00 |
| 2014/0286238 A1* | 9/2014 | Erceg | H04W 80/00 370/328 |
| 2016/0014804 A1* | 1/2016 | Merlin | H04W 72/21 370/329 |
| 2016/0128024 A1* | 5/2016 | Frederiks | H04W 72/04 370/329 |
| 2019/0007973 A1* | 1/2019 | Lou | H04W 72/082 |
| 2019/0165883 A1* | 5/2019 | Chun | H04W 72/0446 |
| 2019/0238288 A1 | 8/2019 | Liu et al. | |
| 2019/0373569 A1* | 12/2019 | Ram | H04W 56/005 |
| 2020/0014509 A1* | 1/2020 | Asterjadhi | H04W 72/0453 |
| 2020/0045656 A1* | 2/2020 | Verma | H04L 27/2613 |
| 2020/0076552 A1* | 3/2020 | Cherian | H04W 72/044 |
| 2020/0137734 A1 | 4/2020 | Chun et al. | |

(Continued)

OTHER PUBLICATIONS

Chinese language office action dated Apr. 26, 2022, issued in application No. TW 110136812.

*Primary Examiner* — Chi Ho A Lee
(74) *Attorney, Agent, or Firm* — McClure, Qualey & Rodack, LLP (57) ABSTRACT

A station (STA) for communicating with an Access Point (AP) in a wireless communication system is provided. The STA includes a wireless transceiver and a processor. The wireless transceiver performs wireless transmission and reception to and from the AP. The processor receives allocation information indicating a first user block for the STA in a first RU of an MU-PPDU from the AP via the wireless transceiver, and the first RU includes multiple user blocks allocated for different STAs. Also, the processor sends Uplink (UL) data or receives Downlink (DL) data in the first user block to or from the AP via the wireless transceiver according to the allocation information.

23 Claims, 7 Drawing Sheets

(56) References Cited

U.S. PATENT DOCUMENTS

| | | | |
|---|---|---|---|
| 2020/0146052 A1* | 5/2020 | Iwai | H04W 74/006 |
| 2020/0305024 A1 | 9/2020 | Chen et al. | |
| 2021/0022156 A1* | 1/2021 | Bhanage | H04W 80/08 |
| 2021/0076420 A1* | 3/2021 | Xin | H04L 47/14 |
| 2021/0144696 A1* | 5/2021 | Cariou | H04W 52/0229 |
| 2021/0385006 A1* | 12/2021 | Ryu | H04L 1/0025 |
| 2022/0053559 A1* | 2/2022 | Jang | H04W 74/0816 |

* cited by examiner

APPARATUSES AND METHODS FOR
FLEXIBLE RESOURCE UNIT (RU)
ALLOCATION

CROSS REFERENCE TO RELATED
APPLICATIONS

This Application claims priority of U.S. Provisional Application No. 62/930,692, filed on Nov. 5, 2019, the entirety of which is incorporated by reference herein.

BACKGROUND OF THE APPLICATION

Field of the Application

The application generally relates to wireless communications, and more particularly, to apparatuses and methods for flexible Resource Unit (RU) allocation.

Description of the Related Art

With growing demand for ubiquitous computing and networking, various wireless technologies have been developed, including Wireless-Fidelity (Wi-Fi) which is a Wireless Local Area Network (WLAN) technology allowing mobile devices, such as a smartphone, a smart pad, a laptop computer, a portable multimedia player, an embedded apparatus, or the like, to obtain wireless services in a frequency band of 2.4 GHz, 5 GHz, 6 Gz or 60 GHz.

The Institute of Electrical and Electronics Engineers (IEEE) has commercialized or developed various technological standards since an initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve performance felt by users demanding high-capacity and high-rate services, IEEE 802.11ax has been proposed, which uses both Orthogonal Frequency Division Multiple Access (OFDMA) and/or MU-MIMO in both DL and uplink (UL) directions. That is, in addition to supporting frequency and spatial multiplexing from an AP to multiple STAs, transmissions from multiple STAs to the AP are also supported in IEEE 802.11ax.

In IEEE 802.11ax, a Resource Unit (RU) refers a group of 78.125 KHz bandwidth subcarriers (tones) used in both DL and UL transmissions for a single STA, and a Multi-User-Physical layer Protocol Data Unit (MU-PPDU) may carry multiple RUs, allowing multiple users to access an AP simultaneously and efficiently.

Figure 1:
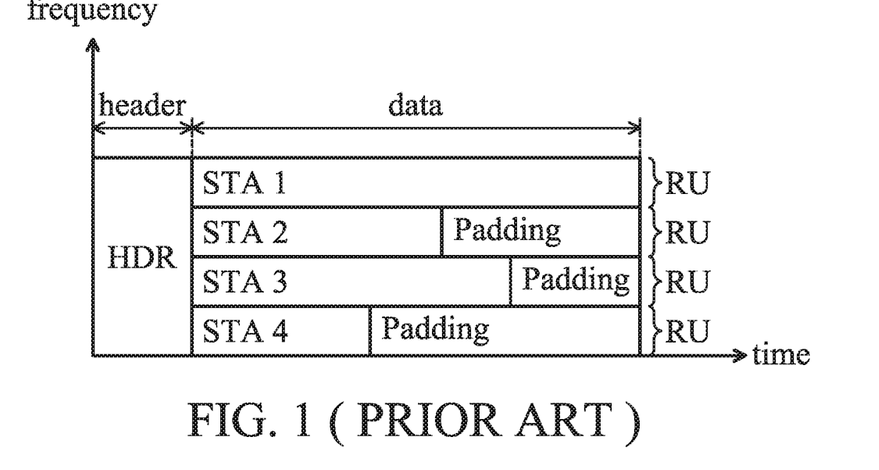
FIG. 1 is a schematic diagram illustrating RU allocation of an MU-PPDU according to the conventional practice.

However, according to the IEEE 802.11ax standards, each RU in an MU-PPDU can only be allocated to a single STA. When some of the STAs aggregated in an MU-PPDU for OFDMA transmission have only a small amount of traffic to send/receive, padding bits will be inserted in the RUs, as shown in FIG. 1, which will inevitably cause a waste of radio resources and decrease the overall system performance.

Therefore, it is desirable to have a more efficient way of RU allocation for the next generation of IEEE 802.11 systems.

BRIEF SUMMARY OF THE APPLICATION

In order to solve the aforementioned problem, the present application proposes a more flexible way of RU allocation for IEEE 802.11be systems or any further generation of IEEE 802.11be systems, in which multiple station (STA) are allowed to share one Resource Unit (RU) in a Multi-User-Physical layer Protocol Data Unit (MU-PPDU). Advantageously, each RU can be more efficiently used among the multiple STAs aggregated in an MU-PPDU for Orthogonal Frequency Division Multiple Access (OFDMA) transmission, thereby improving radio resource utilization and overall system performance.

In one aspect of the application, a STA for communicating with an Access Point (AP) in a wireless communication system is provided. The STA comprises a wireless transceiver and a processor. The wireless transceiver is configured to perform wireless transmission and reception to and from the AP. The processor is configured to: receive allocation information indicating a first user block for the STA in a first RU of an MU-PPDU from the AP via the wireless transceiver, wherein the first RU comprises a plurality of user blocks allocated for different STAs; and send Uplink (UL) data or receive Downlink (DL) data in the first user block to or from the AP via the wireless transceiver according to the allocation information.

In another aspect of the application, a method, executed by a STA for communicating with an Access Point (AP) in a wireless communication system, is provided. The method comprises the following steps: receiving allocation information indicating a first user block for the STA in a first RU of an MU-PPDU from the AP, wherein the first RU comprises a plurality of user blocks allocated for different STAs; and sending UL data or receiving DL data in the first user block to or from the AP according to the allocation information.

In yet another aspect of the application, an AP for communicating with a plurality of stations (STAs) in a wireless communication system is provided. The AP comprises a wireless transceiver and a processor. The wireless transceiver is configured to perform wireless transmission and reception to and from the STAs. The processor is configured to: send allocation information indicating a plurality of user blocks allocated for the STAs in a plurality of RUs of an MU-PPDU to the STAs via the wireless transceiver, wherein at least one of the RUs comprises multiple user blocks allocated for different STAs; and send DL data or receive UL data to or from each of the STAs in a respective one of the user blocks via the wireless transceiver.

Other aspects and features of the present application will become apparent to those with ordinary skill in the art upon review of the following descriptions of specific embodiments of the methods for flexible RU allocation.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 2:
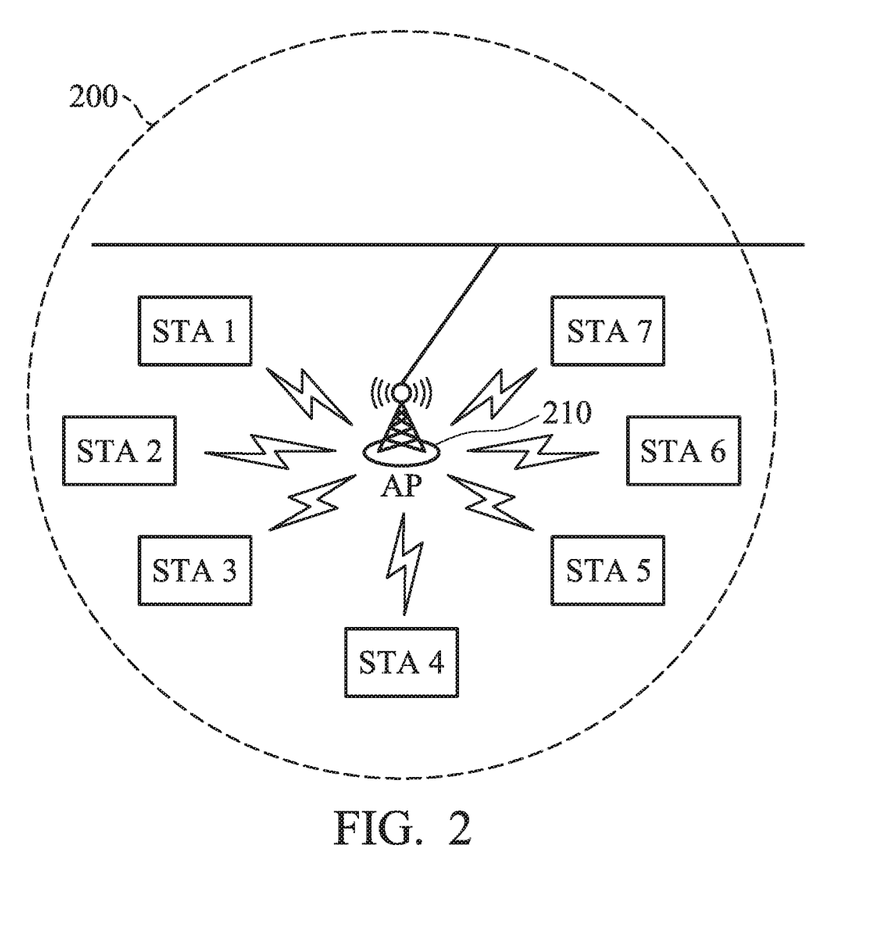
FIG. 2 is a block diagram of a wireless communication system according to an embodiment of the application.

FIG. 2 is a block diagram of a wireless communication system according to an embodiment of the application.

As shown in FIG. 2, the wireless communication system 200 includes an Access Point (AP) 210 and a plurality of stations (STAs) 1~7. The AP 210 is an entity compatible with the Institute of Electrical and Electronics Engineers (IEEE) 802.11 standards to provide and manage the access to the wireless medium for the STAs 1~7.

In one embodiment, the AP 210 may be an Extremely High Throughput (EHT) AP which is compatible with the IEEE 802.11be standards.

In another embodiment, the AP 210 may be an AP which is compatible with any IEEE 802.11 standards later than 802.11be.

Each of the STAs 1~7 may be a mobile phone (e.g., feature phone or smartphone), a panel Personal Computer (PC), a laptop computer, or any computing device, as long as it is compatible with the same IEEE 802.11 standards as the AP 210. Each of the STAs 1~7 may associate and communicate with the AP 210 to send or receive data in an uplink (UL) or downlink (DL) Multi-User-Physical layer Protocol Data Unit (MU-PPDU).

At a given point in time, multiple STAs 1~7, in the wireless communication system 100, may wish to send/receive data. Instead of scheduling medium access for the STAs 1~7 in different respective UL/DL time intervals, the AP 210 may schedule medium access for the STAs 1~7 to support UL/DL MU transmission techniques, according to which the STAs 1~7 may send/receive MU-PPDUs to the AP 210 simultaneously during a given time interval.

For example, by using DL MU OFDMA techniques during a given DL time interval, the STAs 1~7 may receive DL MU-PPDUs from the AP 210, and in each DL MU-PPDU, the same or different Resource Units (RUs) may be allocated to the STAs 1~7.

In another example, by using UL MU Multiple-Input Multiple-Output (MU-MIMO) techniques during a given UL time interval, the STAs 1~7 may send UL MU-PPDUs to the AP 210 via different respective spatial streams allocated by the AP 210, and in each UL MU-PPDU, the same or different RUs may be allocated to the STAs 1~7.

To be more specific, each RU in an MU-PPDU may be divided into one or more user blocks, and each user block is allocated to a respective STA for OFDMA transmission or reception. That is, multiple STAs are allowed to share one RU in an MU-PPDU.

To manage the RU allocations within the MU-PPDUs, the AP 210 may provide allocation information indicating the user blocks for multiple STAs in each RU of an MU-PPDU.

In one embodiment, the allocation information may be provided in the header of a DL MU-PPDU.

In another embodiment, the allocation information may be provided in the trigger frame of an UL PPDU before the UL transmission of the STAs 1~7.

It should be understood that the components described in the embodiment of FIG. 2 are for illustrative purposes only and are not intended to limit the scope of the application. For example, the wireless communication system 200 may include more or fewer STAs.

Figure 3:
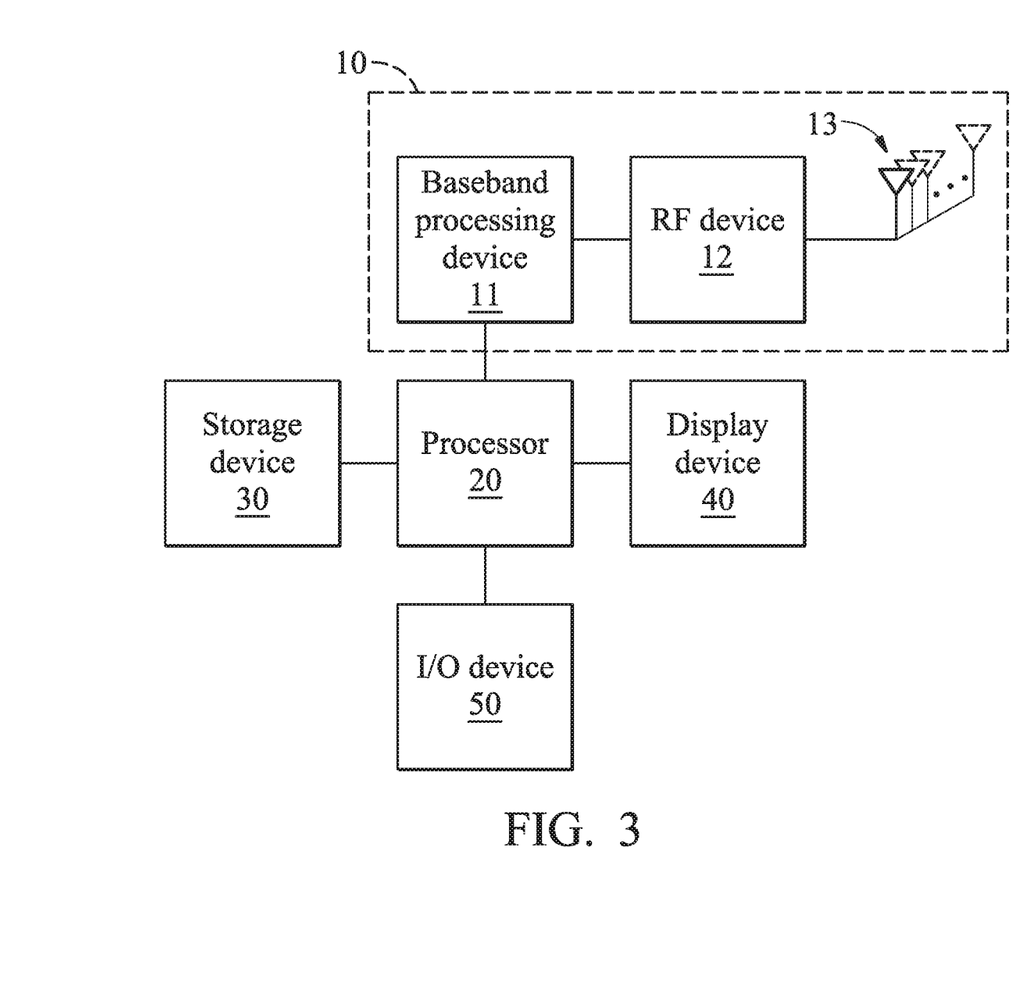
FIG. 3 is a block diagram illustrating an STA according to an embodiment of the application.

FIG. 3 is a block diagram illustrating an STA according to an embodiment of the application.

As shown in FIG. 3, an STA may include a wireless transceiver 10, a processor 20, a storage device 30, a display device 40, and an Input/Output (I/O) device 50.

The wireless transceiver 10 is configured to perform wireless transmission and reception to and from the AP 210. For example, the wireless transceiver 10 may be a Wi-Fi chip.

Specifically, the wireless transceiver 10 may include a baseband processing device 11, a Radio Frequency (RF) device 12, and antenna 13, wherein the antenna 13 may include an antenna array for UL/DL Multiple Input-Multiple-Output (MIMO).

The baseband processing device 11 is configured to perform baseband signal processing, such as Analog-to-Digital Conversion (ADC)/Digital-to-Analog Conversion (DAC), gain adjusting, modulation/demodulation, encoding/decoding, and so on. The baseband processing device 11 may contain multiple hardware components, such as a baseband processor, to perform the baseband signal processing.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The processor 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the AP 210, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the processor 20 coordinates the aforementioned operations of the wireless transceiver 10, the storage device 30, the display device 40, and the I/O device 50 for performing the method of the present application.

In another embodiment, the processor 20 may be incorporated into the baseband processing device 11, to serve as a baseband processor.

As will be appreciated by persons skilled in the art, the circuits of the processor 20 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 3 are for illustrative purposes only and are not intended to limit the scope of the application. For example, an STA may include more components, such as another wireless transceiver for providing telecommunication services, a Global Positioning System (GPS) device for use of some location-based services or applications, and/or a battery for powering the other components of the STA, etc. Alternatively, an STA may include fewer components. For example, the STA may not include the display device 40 and/or the I/O device 50.

Figure 4:
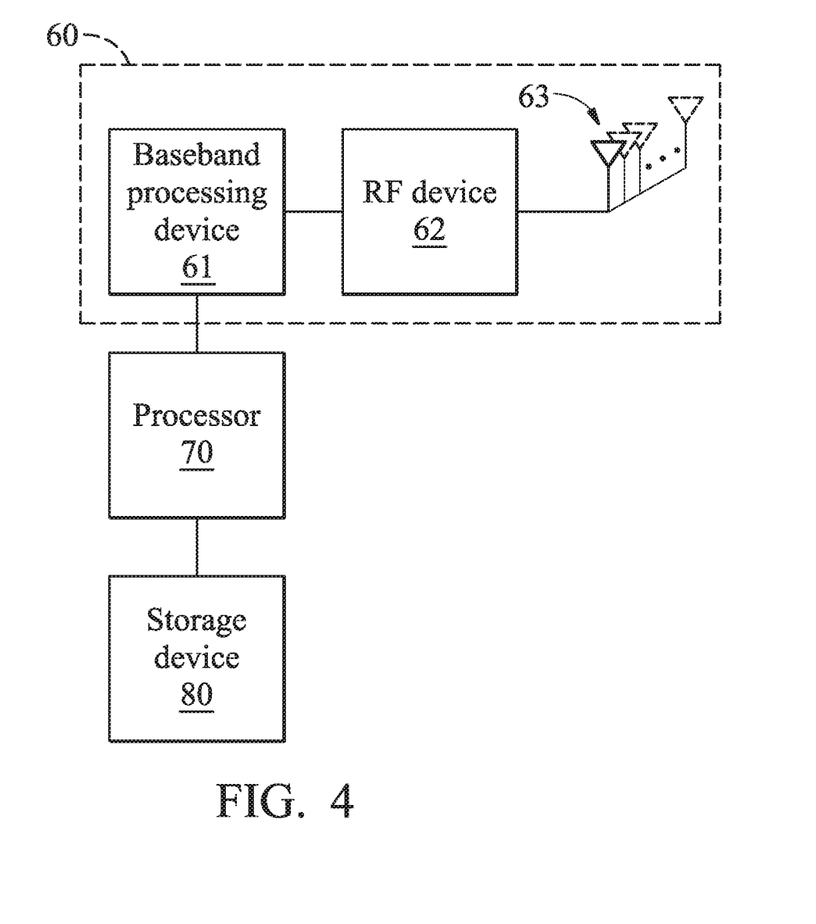
FIG. 4 is a block diagram illustrating an AP according to an embodiment of the application.

FIG. 4 is a block diagram illustrating an AP according to an embodiment of the application.

As shown in FIG. 4, an AP may include a wireless transceiver 60, a processor 70, and a storage device 80.

The wireless transceiver 60 is configured to perform wireless transmission and reception to and from one or more STAs (e.g., the STAs 1~7). For example, the wireless transceiver 60 may be a Wi-Fi chip.

Specifically, the wireless transceiver 60 may include a baseband processing device 61, an RF device 62, and antenna 63, wherein the antenna 63 may include an antenna array for UL/DL MU-MIMO.

The baseband processing device 61 is configured to perform baseband signal processing, such as ADC/DAC, gain adjusting, modulation/demodulation, encoding/decoding, and so on. The baseband processing device 61 may contain multiple hardware components, such as a baseband processor, to perform the baseband signal processing.

The RF device 62 may receive RF wireless signals via the antenna 63, convert the received RF wireless signals to baseband signals, which are processed by the baseband processing device 61, or receive baseband signals from the baseband processing device 61 and convert the received baseband signals to RF wireless signals, which are later transmitted via the antenna 63. The RF device 62 may also contain multiple hardware devices to perform radio frequency conversion. For example, the RF device 62 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi Fi technology, or any radio frequency utilized in the future evolution of the Wi-Fi technology.

The processor 70 may be a general-purpose processor, an MCU, an application processor, a DSP, a GPH/HPU/NPU, or the like, which includes various circuits for providing the functions of data processing and computing, controlling the wireless transceiver 60 for wireless communications with the STAs 1~7, and storing and retrieving data (e.g., program code) to and from the storage device 80.

In particular, the processor 70 coordinates the aforementioned operations of the wireless transceiver 60 and the storage device 80 for performing the method of the present application.

In another embodiment, the processor 70 may be incorporated into the baseband processing device 61, to serve as a baseband processor.

As will be appreciated by persons skilled in the art, the circuits of the processor 70 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, communication protocols, and/or the method of the present application.

It should be understood that the components described in the embodiment of FIG. 4 are for illustrative purposes only and are not intended to limit the scope of the application. For example, an AP may include more components, such as a display device for providing a display function, and/or an I/O device for providing an MMI for interaction with users.

Figure 5:
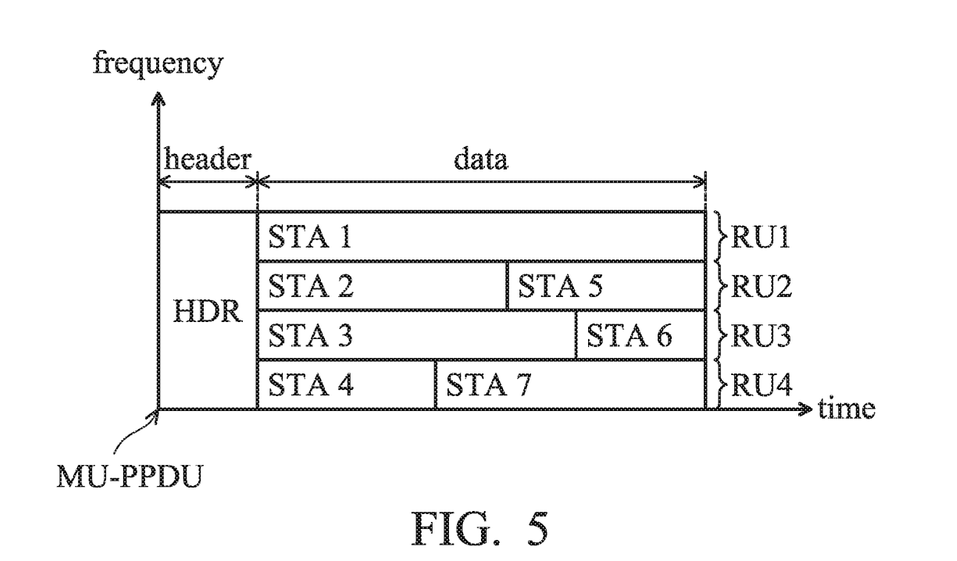
FIG. 5 is a schematic diagram illustrating the RU allocation of a DL/UL MU-PPDU according to an embodiment of the application.

FIG. 5 is a schematic diagram illustrating the RU allocation of a DL/UL MU-PPDU according to an embodiment of the application.

As shown in FIG. 5, the data field of the MU-PPDU may include multiple RUs (e.g., 4 RUs).

Each RU denotes a group of 78.125 KHz bandwidth subcarriers (tones) used in DL/UL transmissions. With OFDMA, different transmit powers may be applied to different RUs. Although there are 4 RUs exemplified in this embodiment for the convenience of illustration, there may be maximum of 9 RUs for 20 MHz bandwidth, 18 in case of 40 MHz, or more in case of 80 or 160 MHz bandwidth. The RUs enable an AP (e.g., the AP 210) to allow multiple STAs to access it simultaneously and efficiently.

Specifically, RU1 is allocated to STA 1 alone, RU2 is allocated to STAs 2 and 5, RU3 is allocated to STAs 3 and 6, and RU4 is allocated to STAs 4 and 7. To further clarify, each of RU2-RU4 is divided into multiple user blocks, each of which is allocated to a respective STA. In other words, multiple STAs are allowed to share a single RU in an MU-PPDU.

It should be noted that, in contrast to the RU allocation applied in the conventional practice (as shown in FIG. 1), the time-frequency resources not used by the first STA in each RU are allocated for use of another STA, instead of being inserted with padding bits.

Figure 6:
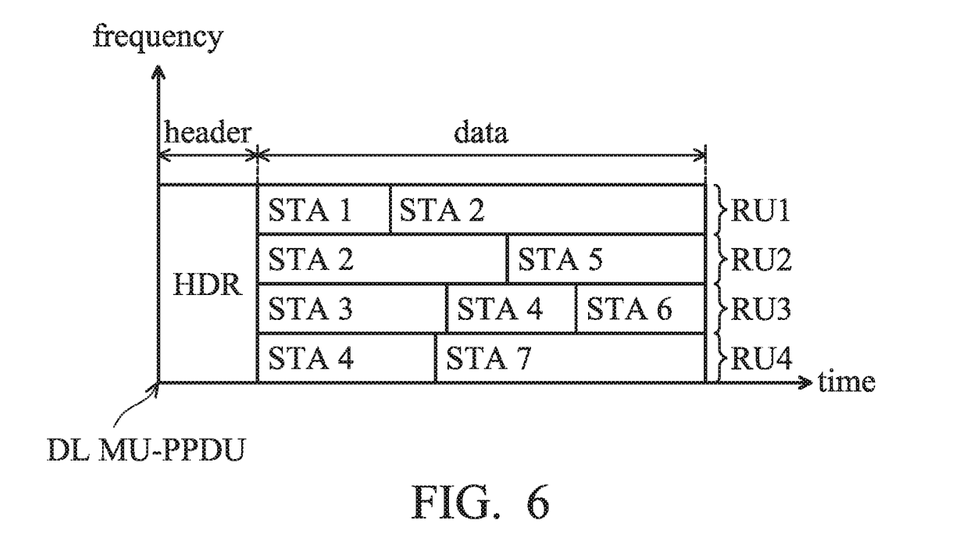
FIG. 6 is a schematic diagram illustrating the RU allocation of a DL MU-PPDU according to an embodiment of the application.

FIG. 6 is a schematic diagram illustrating the RU allocation of a DL MU-PPDU according to an embodiment of the application.

As shown in FIG. 6, the data field of the DL MU-PPDU may include multiple RUs (e.g., 4 RUs). Specifically, RU1 is allocated to STAs 1 and 2, RU2 is allocated to STAs 2 and 5, RU3 is allocated to STAs 3, 4, and 6, and RU4 is allocated to STAs 4 and 7.

Please note that, in this embodiment, an STA may be allocated with multiple user blocks in different RUs, and the user blocks for the same STA in different RUs are allowed to overlap in the time domain. For example, STA 2 is allocated with the second user block in RU1 and the first user block in RU2, wherein the user block for STA 2 in RU1 and the user block for STA 2 in RU2 overlap in the time domain.

Alternatively, the user blocks for the same STA in different RUs may not overlap in the time domain. For example, STA 4 is allocated with the second user block in RU3 and the first user block in RU4, wherein the user block for STA 4 in RU3 and the user block for STA 4 in RU4 do not overlap in the time domain.

It should be understood that the rule of whether the user blocks for the same STA in different RUs are allowed to overlap in the time domain may remain the same for all STAs within a DL MU-PPDU. That is, in one embodiment, the user blocks for the same STA in different RUs of a DL MU-PPDU are allowed to overlap in the time domain, while in another embodiment, the user blocks for the same STA in different RUs of a DL MU-PPDU are not allowed to overlap in the time domain.

Figure 7:
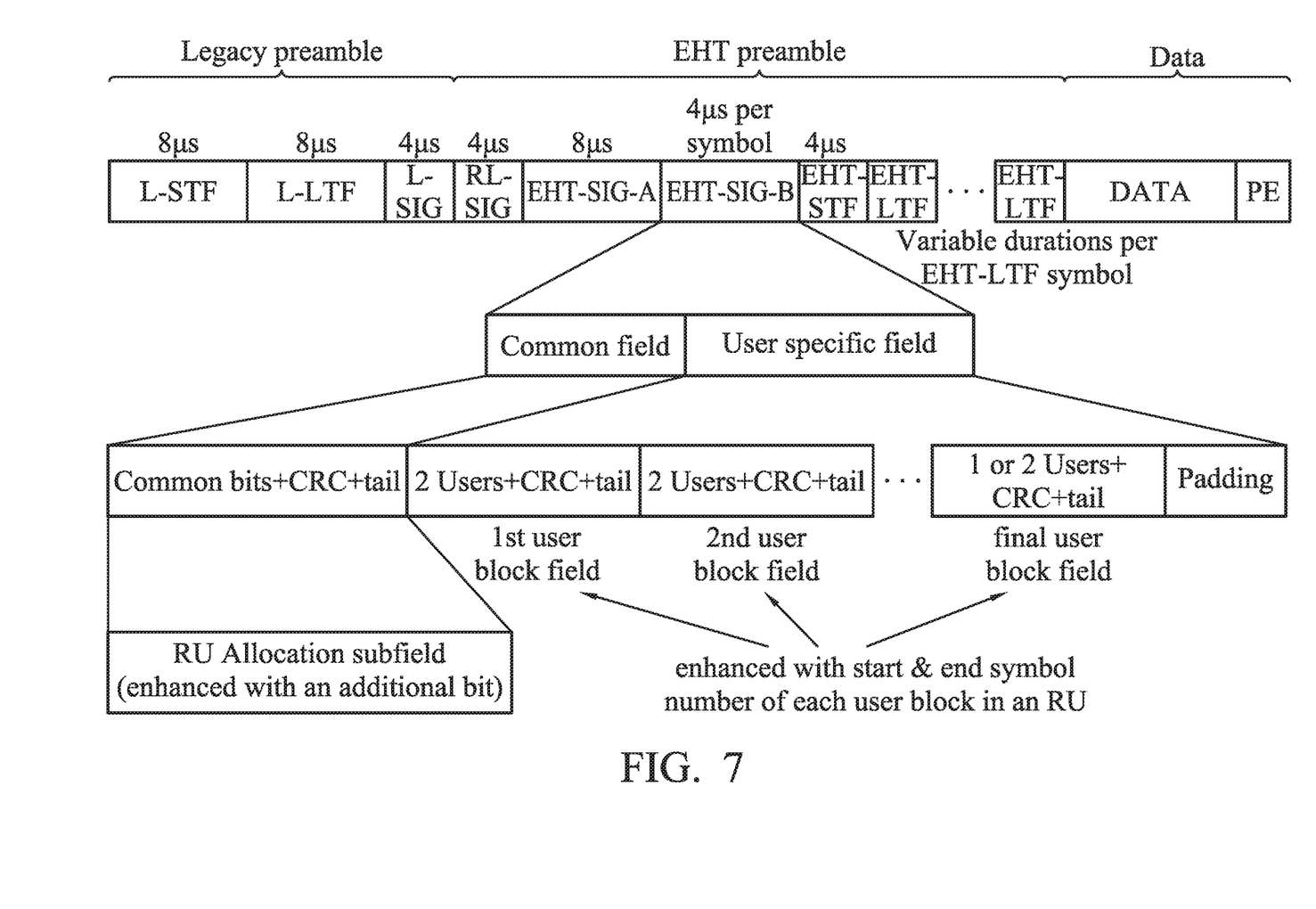
FIG. 7 is a schematic diagram illustrating the provision of the allocation information for RU allocation in the header of a DL MU-PPDU according to an embodiment of the application.

FIG. 7 is a schematic diagram illustrating the provision of the allocation information for RU allocation in the header of a DL MU-PPDU according to an embodiment of the application.

As shown in FIG. 7, the header of the DL MU-PPDU may include a legacy (non-EHT) preamble and an EHT preamble. The legacy preamble may include the L-STF, L-LTF and L-SIG, each of which is decodable by legacy devices and is included for backward compatibility and coexistence with the legacy devices, while the EHT preamble can only be decoded by 802.11be devices.

Specifically, the EHT preamble may include the RL-SIG, EHT-SIG-A, EHT-SIG-B, EHT-STF, EHT-LTF, wherein the allocation information for RU allocation may be provided in the EHT-SIG-B field.

The EHT-SIG-B field may include a common field and a user specific field. The common field may include an RU allocation subfield to specify the RU assignment and the number of users per RU for each 20 MHz bandwidth segment for MU-MIMO cases or for MU-OFDMA multiplexing cases.

The RU Allocation subfield in the common field of EHT-SIG-B may consist of 8 bits that indicate this information for each 20 MHz PPDU bandwidth.

It should be noted that, in the present application, an additional bit is added to each RU Allocation subfield, wherein the additional bit is used to indicate MU-OFDMA multiplexing. For example, the additional bit may be added to the start of the RU Allocation subfield, and if this bit is set, it means that MU-OFDMA multiplexing with the flexible RU allocation is enabled and the rest bits indicate the RU assignment and the number of users (i.e., STAs) per RU. Otherwise, if this bit is not set, it means that MU-OFDMA multiplexing with the flexible RU allocation is disabled.

The user specific field may include multiple user block fields, each of which includes two new subfields to indicate the start symbol number and the end symbol number of each user block in an RU.

With the enhanced RU Allocation subfield and the enhanced user block fields, the allocation information for RU allocation of a DL MU-PPDU is determined.

Figure 8:
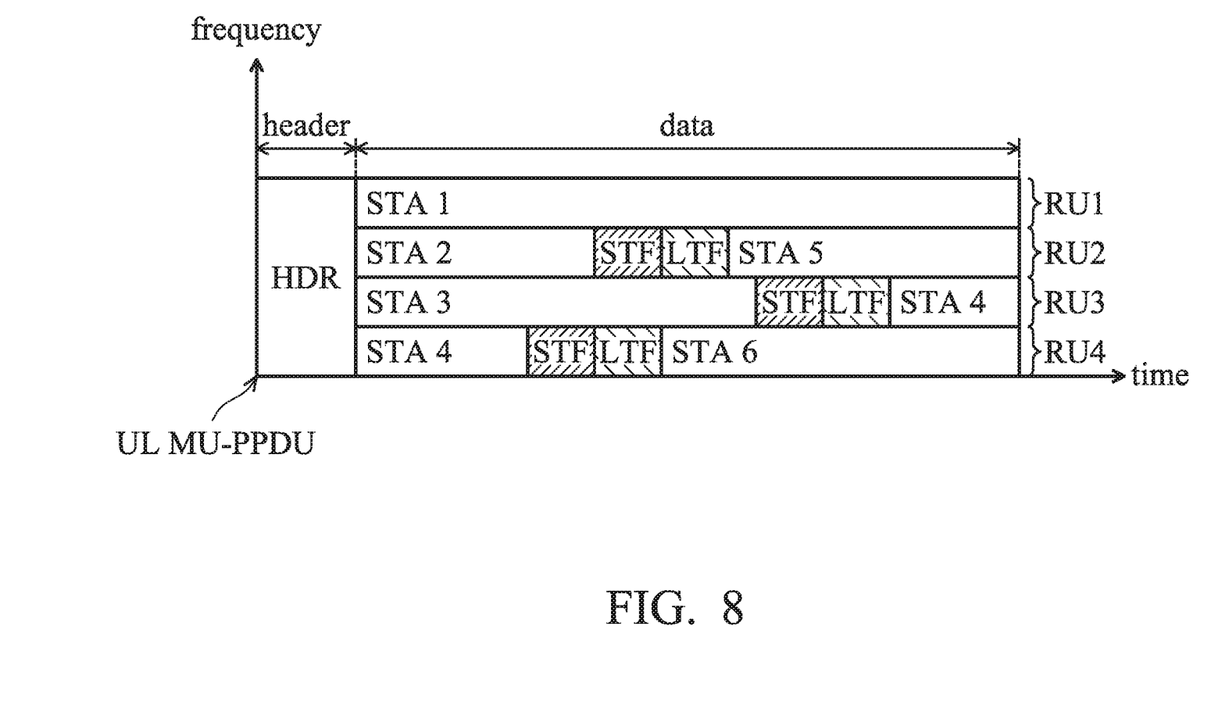
FIG. 8 is a schematic diagram illustrating the RU allocation of a UL MU-PPDU according to an embodiment of the application.

FIG. 8 is a schematic diagram illustrating the RU allocation of a UL MU-PPDU according to an embodiment of the application.

As shown in FIG. 8, the data field of the UL MU-PPDU may include multiple RUs (e.g., 4 RUs). Specifically, RU1 is allocated to STA 1 alone, RU2 is allocated to STAs 2 and 5, RU3 is allocated to STAs 3 and 4, and RU4 is allocated to STAs 4 and 6.

Please note that, in this embodiment, an STA may be allocated with multiple user blocks in different RUs, and the user blocks for the same STA in different RUs is not allowed to overlap in the time domain. For example, STA 4 is allocated with the second user block in RU3 and the first user block in RU4, wherein the user block for STA 4 in RU3 and the user block for STA 4 in RU4 do not overlap in the time domain.

In addition, the user blocks allocated for different STAs in the same RU may be separated using a Short Training Field (STF) and a Long Training Field (LTF) to clarify the boundary of the user blocks for different STAs.

Figure 9:
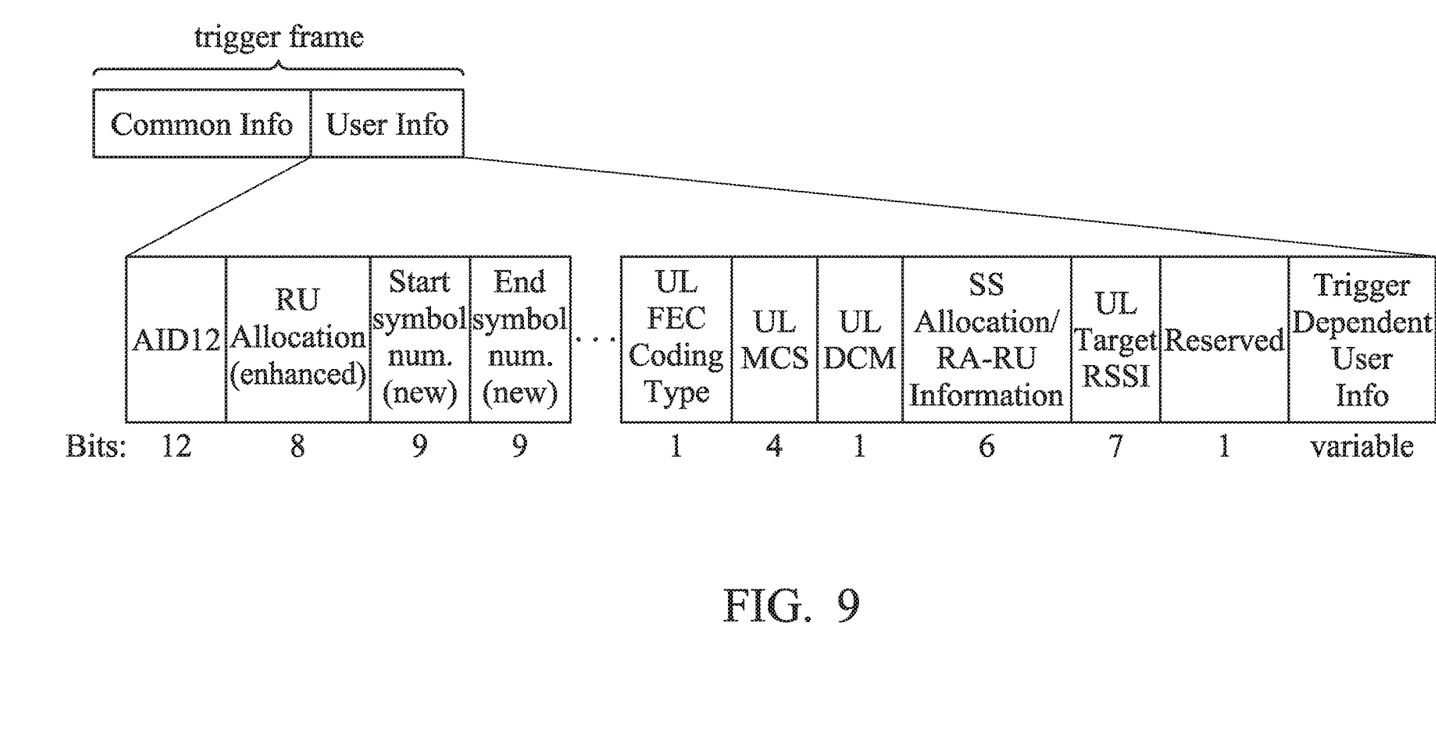
FIG. 9 is a schematic diagram illustrating the provision of the allocation information for RU allocation in a trigger frame of a PPDU according to an embodiment of the application.

FIG. 9 is a schematic diagram illustrating the provision of the allocation information for RU allocation in a trigger frame of a PPDU according to an embodiment of the application.

A trigger frame may be sent by an AP to multiple STAs to trigger them to send data in UL MU-PPDU(s).

As shown in FIG. 9, a trigger frame may include a common info field and a user info field. The user info field may include a plurality of subfields, wherein the RU Allocation subfield may be enhanced as the embodiment of FIG. 7 and a plurality of new subfields may be introduced to indicate the start symbol number and the end symbol number of each user block in an RU of the UL MU-PPDU.

In view of the forgoing embodiments, it will be appreciated that the present application realizes flexible RU allocation for IEEE 802.11 (e.g., 802.11be) systems, by allowing multiple STAs to share one RU in an MU-PPDU. Advantageously, each RU can be more efficiently used among the multiple STAs aggregated in an MU-PPDU for OFDMA transmission, thereby improving radio resource utilization and overall system performance.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A station (STA) for communicating with an Access Point (AP) in a wireless communication system, comprising:
   a wireless transceiver, configured to perform wireless transmission and reception to and from the AP; and
   a processor, configured to:
   receive allocation information indicating a first user block for the STA in a first Resource Unit (RU) of a Multi-User-Physical layer Protocol Data Unit (MU-PPDU) from the AP via the wireless transceiver, wherein the first RU comprises a plurality of user blocks allocated for different STAs; and
   send Uplink (UL) data or receive Downlink (DL) data in the first user block to or from the AP via the wireless transceiver according to the allocation information,
   wherein the allocation information comprises:
   a number of a symbol where the first user block for the STA starts in the first RU; and
   a number of a symbol where the first user block for the STA ends in the first RU.

2. The STA as claimed in claim 1, wherein the allocation information is received in a header of a DL MU-PPDU or in a trigger frame of a PPDU.

3. The STA as claimed in claim 2, wherein the allocation information is included in an Extremely High Throughput-Signaling B (EHT-SIGB) field in the header of the DL MU-PPDU or in a User info field in the trigger frame of the PPDU.

4. The STA as claimed in claim 1, wherein the allocation information further indicates a second user block for the STA in a second RU of the MU-PPDU, and the processor is further configured to send UL data or receive DL data in the second user block to or from the AP via the wireless transceiver according to the allocation information.

5. The STA as claimed in claim 4, wherein the first user block and the second user block for the STA overlap in time domain, in response to the MU-PPDU being a DL MU-PPDU.

6. The STA as claimed in claim 4, wherein the first user block and the second user block for the STA do not overlap in the time domain, in response to the MU-PPDU being a DL MU-PPDU or a UL MU-PPDU.

7. The STA as claimed in claim 1, wherein the plurality of user blocks allocated for different STAs are separated by a Short Training Field (STF) and a Long Training Field (LTF) in the first RU, in response to the MU-PPDU being a UL MU-PPDU.

8. The STA as claimed in claim 1, wherein the wireless communication system is compatible with Institute of Electrical and Electronics Engineers (IEEE) 802.11 standard.

9. A method, executed by a station (STA) for communicating with an Access Point (AP) in a wireless communication system, the method comprising:
   receiving allocation information indicating a first user block for the STA in a first Resource Unit (RU) of a Multi-User-Physical layer Protocol Data Unit (MU-PPDU) from the AP, wherein the first RU comprises a plurality of user blocks allocated for different STAs; and
   sending Uplink (UL) data or receiving Downlink (DL) data in the first user block to or from the AP according to the allocation information,
   wherein the allocation information comprises:
   a number of a symbol where the first user block for the STA starts in the first RU; and
   a number of a symbol where the first user block for the STA ends in the first RU.

10. The method as claimed in claim 9, wherein the allocation information is received in a header of a DL MU-PPDU or in a trigger frame of a PPDU.

11. The method as claimed in claim 10, wherein the allocation information is included in an Extremely High Throughput-Signaling B (EHT-SIGB) field in the header of the DL MU-PPDU or in a User info field in the trigger frame of the PPDU.

12. The method as claimed in claim 9, wherein the allocation information further indicates a second user block for the STA in a second RU of the MU-PPDU, and the method further comprises:
   sending UL data or receiving DL data in the second user block to or from the AP according to the allocation information.

13. The method as claimed in claim 12, wherein the first user block and the second user block for the STA overlap in time domain, in response to the MU-PPDU being a DL MU-PPDU.

14. The method as claimed in claim 12, wherein the first user block and the second user block for the STA do not overlap in time domain, in response to the MU-PPDU being a DL MU-PPDU or a UL MU-PPDU.

15. The method as claimed in claim 9, wherein the plurality of user blocks allocated for different STAs are separated by a Short Training Field (STF) and a Long Training Field (LTF) in the first RU, in response to the MU-PPDU being a UL MU-PPDU.

16. The method as claimed in claim 9, wherein the wireless communication system is compatible with Institute of Electrical and Electronics Engineers (IEEE) 802.11 standard.

17. An Access Point (AP) for communicating with a plurality of stations (STAs) in a wireless communication system, comprising:
   a wireless transceiver, configured to perform wireless transmission and reception to and from the STAs; and
   a processor, configured to:
   send allocation information indicating a plurality of user blocks allocated for the STAs in a plurality of Resource Units (RUs) of a Multi-User-Physical layer Protocol Data Unit (MU-PPDU) to the STAs via the wireless transceiver, wherein the first RU comprises a plurality of user blocks allocated for different STAs; and
   send Downlink (DL) data or receive Uplink (UL) data to or from each of the STAs in a respective one of the user blocks via the wireless transceiver,
   wherein the allocation information comprises:
   a number of a symbol where one user block starts in an RU; and a number of a symbol where one user block ends in the RU.

18. The AP as claimed in claim 17, wherein the allocation information is sent in a header of a DL MU-PPDU or in a trigger frame of a PPDU.

19. The AP as claimed in claim 18, wherein the allocation information is included in an Extremely High Throughput-Signaling B (EHT-SIGB) field in the header of the DL MU-PPDU or in a User info field in the trigger frame of the PPDU.

20. The AP as claimed in claim 17, wherein at least two of the user blocks are allocated for the same STA in different RUs, and the at least two user blocks for the same STA overlap in time domain, in response to the MU-PPDU being a DL MU-PPDU.

21. The AP as claimed in claim 17, wherein at least two of the user blocks are allocated for the same STA in different RUs, and the at least two user blocks for the same STA do not overlap in time domain, in response to the MU-PPDU being a DL MU-PPDU or a UL MU-PPDU.

22. The AP as claimed in claim 17, wherein the plurality of user blocks allocated for different STAs are separated by a Short Training Field (STF) and a Long Training Field (LTF), in response to the MU-PPDU being a UL MU-PPDU.

23. The AP as claimed in claim 17, wherein the wireless communication system is compatible with Institute of Electrical and Electronics Engineers (IEEE) 802.11 standard.

\* \* \* \* \*